(No Model.) 8 Sheets—Sheet 3.

H. FLAD.
ELECTRO MAGNETIC AIR BRAKE.

No. 296,546. Patented Apr. 8, 1884.

WITNESSES
Franck L. Ourand
S. G. Nottingham

INVENTOR
Henry Flad.
By H. A. Seymour
Attorney (No Model.) 8 Sheets—Sheet 5.

H. FLAD.
ELECTRO MAGNETIC AIR BRAKE.

No. 296,546. Patented Apr. 8, 1884.

WITNESSES
Franck L. Durand
S. J. Nottingham

INVENTOR
Henry Flad
B. H. A. Seymour
Attorney (No Model.) 8 Sheets—Sheet 6.

H. FLAD.
ELECTRO MAGNETIC AIR BRAKE.

No. 296,546. Patented Apr. 8, 1884.

WITNESSES
Franck L. Durand
S. G. Nottingham

INVENTOR
Henry Flad
B. H. A. Supman
Attorney (No Model.) 8 Sheets—Sheet 8.

H. FLAD.
ELECTRO MAGNETIC AIR BRAKE.

No. 296,546. Patented Apr. 8, 1884.

WITNESSES
Franck L. Ourand
S. G. Nottingham

INVENTOR
Henry Flad.
By H. A. Seymour
Attorney

UNITED STATES PATENT OFFICE.

HENRY FLAD, OF ST. LOUIS, MISSOURI.

ELECTRO-MAGNETIC AIR-BRAKE.

SPECIFICATION forming part of Letters Patent No. 296,546, dated April 8, 1884.

Application filed June 7, 1883. (No model.)

*To all whom it may concern:*

Be it known that I, HENRY FLAD, of St. Louis, in the county of St. Louis and State of Missouri, have invented certain new and useful Improvements in Electro-Magnetic Air-Brakes; and I do hereby declare the following to be a full, clear, and exact description of the invention, such as will enable others skilled in the art to which it appertains to make and use the same.

This invention relates to electro-magnetic devices for controlling air-brakes on railway-cars. When the brakes of railway-cars are operated by air, whether the same be compressed to act on a piston or attenuated on one side of a piston, so as to allow the atmospheric air to supply the power for the operation of the brakes, there have heretofore existed difficulties in the way of the efficient and prompt application of the brakes on trains composed of a great number of cars, or such as might usually be termed "long trains." These difficulties may be stated as follows:

First. The time required for the air to travel from the air pump or reservoir on the engine increases rapidly with the number of cars, and therefore the brakes cannot be operated as promptly as is desirable.

Second. The brakes of the cars are applied successively, those of the car nearest to the air pump or reservoir being applied first, and those on the car at the rear end of the train being applied after the lapse of a considerable period, during which the brakes have been applied to the intermediate cars, one after another, and during this period the train is subjected to a series of violent shocks from the fact that the momentum of the cars on which the brakes have not been applied causes such cars to run up against that portion of the train the speed of which has been slackened by the application of the brakes. These shocks follow one another as the cars are successively brought under the contact of the brakes; but the first is the most violent, because the remainder of the train runs onto the first car, which is checked.

Third. The release of the brakes is delayed from the same cause.

Fourth. Every time the brakes are operated not only the cylinders require to be charged or exhausted, as the case may be, but the whole system of pipes and connecting-hose has to undergo the process either of filling with compressed air or having the air exhausted therefrom, according to the system employed. The necessity, therefore, has existed of making the air-supply pipes of very small diameter, and the pumps or reservoirs of great capacity in the attempt to obtain a prompt filling or exhaustion of the pipes; but even when such relative proportions are given to the pipes and their source of supply there is another disadvantage arising from the great frictional resistance to the flow of the air through the pipes of small diameter, this resistance resulting in the lapse of a considerable time before the proper condition can be established. These above-enumerated disadvantages attend all air-brake systems with which I am acquainted, from the fact that the charging or exhaustion of the brake-cylinders must be effected entirely through the main supply-conduit at the terminus thereof on the engine. The obviation of these disadvantages is the object of my invention, the essential principle of which consists in controlling the influx and efflux of the air to and from the brake-cylinders by means of valves controlled by electro-magnetism, each cylinder being provided with ports communicating, respectively, with the main supply-pipe and the external air or atmosphere. The devices which I have invented for carrying out this principle will be readily understood from the following particular description, in connection with the accompanying drawings, and will be definitely pointed out in the appended claims.

Among the air-brakes to which my invention is applicable I will mention, first, brakes of the Mallinckrodt type, in which the main pipes and brake-cylinders must be kept normally charged with the compressed air, which drives a piston in each cylinder, to raise the car-body and hold off the brakes by means of bell-crank levers, which are connected to the brakes, the air being permitted to escape, to allow the car-body to descend and operate the levers to set the brakes; second, compressed-air brakes of the Westinghouse type, in which compressed air is used to drive the pistons directly to set the brakes; and, third, vacuum-brakes, in which the brake-cylinder is kept exhausted on one side of the piston and atmospheric pressure admitted to the other side, so that the piston will in one style of such brakes be caused to normally hold off the brake-blocks, and in another form to apply the brakes by atmospheric pressure.

In the accompanying drawings I have illustrated a construction of brake-operating air-cylinder which is applicable to any of the systems above referred to, and the operation of which, in connection with each of the said systems, will be hereinafter explained.

The letter A indicates the cylinder; B, its piston, and C the piston-rod, which is to be connected with the brake-levers or other brake-operating connections outside of the cylinder in the usual manner.

Figure 3:
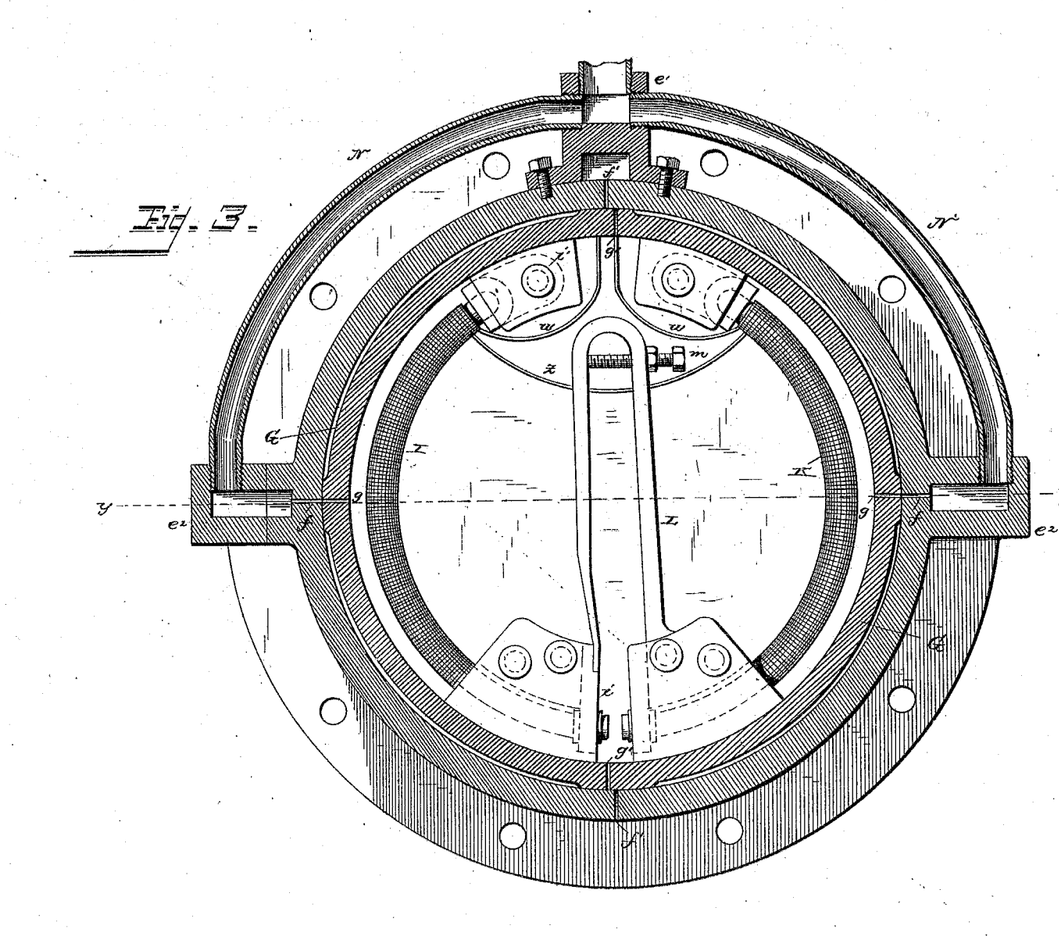
Fig. 3 is a cross-section of the cylinder, valve, and branch-pipe connection on the line $x'\,x'$ of Fig. 1, looking away from the piston.
Figure 4:
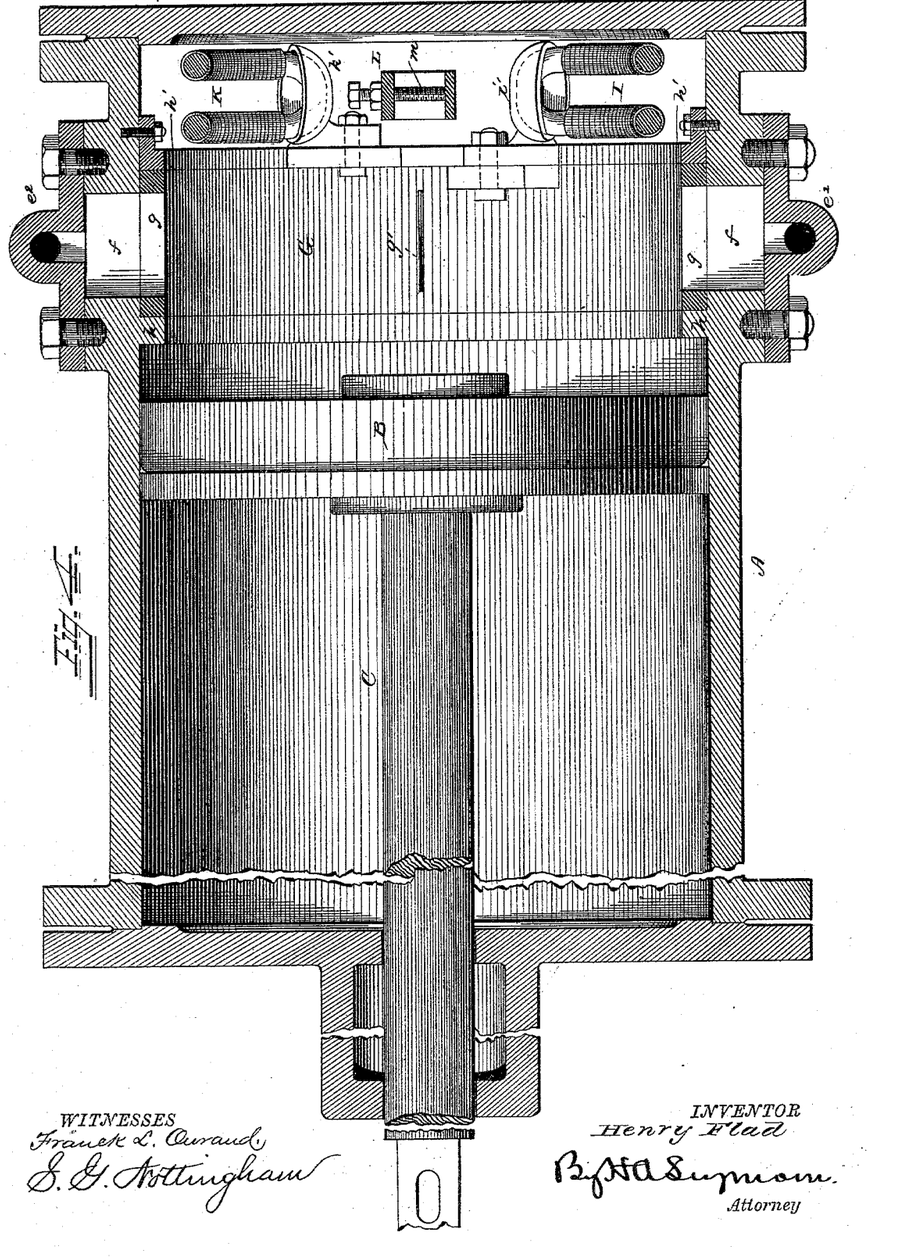
Fig. 4 is a longitudinal section of the cylinder and transverse section of the interior parts, except the piston, on the line $y\,y$ of Figs. 1, 2, and 3.
Figure 5:
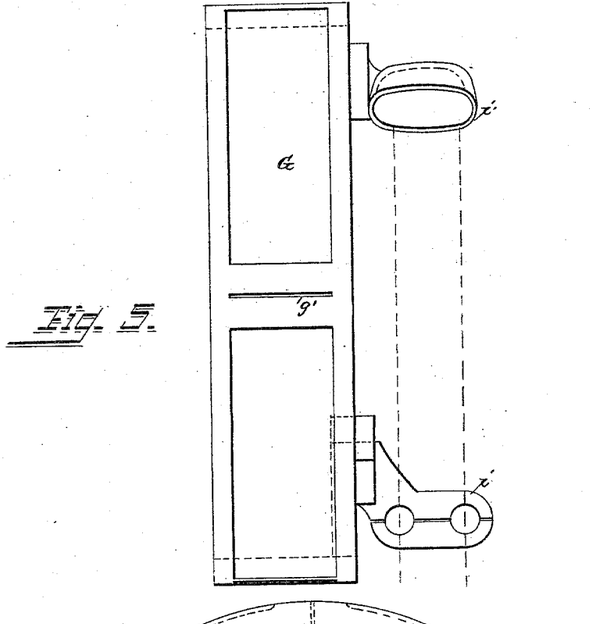
Fig. 5 is a side view of the valve and its devices for supporting the movable magnet.
Figure 6:
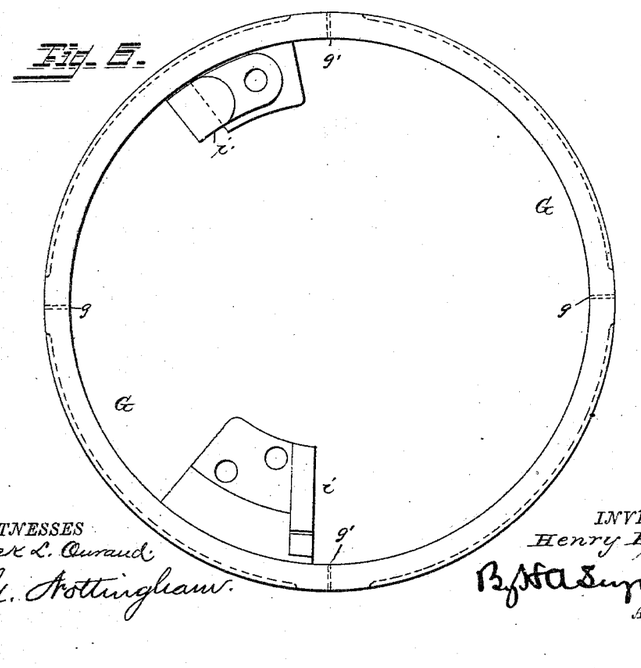
Fig. 6 is an edge view of the same.
Figure 7:
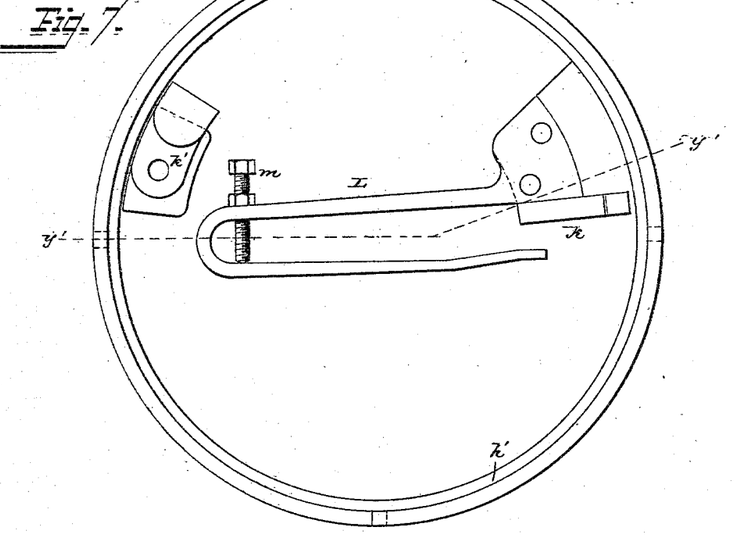
Fig. 7 is an edge view of the removable valve-seat flange and its devices for supporting the stationary magnet.
Figure 8:
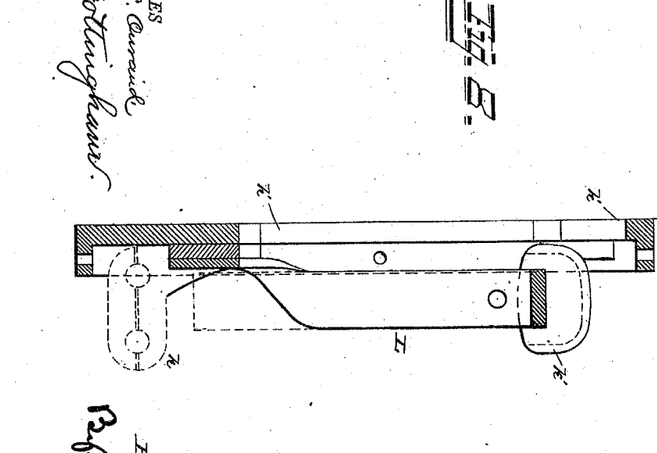
Fig. 8 is a section on the line $y'\,y'$ of Fig. 7.

D is the main pipe, and E the branch pipe connecting it with an elbow-connection, $e$, which is connected to a bracket-connection, $e'$, from opposite sides of which two curved pipes, N N, extend each one-fourth the distance around the cylinder and terminate in hollow bridge-pieces $e^2$, which cover and have their interior cavities in communication with slits $ff$, cut through the shell of the cylinder at diametrically-opposite points. In a plane at right angles to the plane of these two slits $ff$ two other slits, $f'f'$, are cut through the cylinder-shell diametrically opposite each other, and afford communication between the interior of the cylinder and external air at proper times, as will be presently explained. The opening and closing of these two pairs of slits is effected by a valve, G, which has the shape of a flat band, and is fitted to a seat inside the cylinder between a narrow internally-projecting flange, $h$, and a removable flange, $h'$. This band-valve has cut through it four slits, $g\,g$ and $g'\,g'$, the two former being diametrically opposite each other in a plane at right angles to the planes of the other two, which are not diametrically opposite each other, but nearly so, being in parallel planes on opposite sides of the center of the valve, and each removed from a diametric plane a distance equal to the width of one slit. By referring to Fig. 3 it will be seen that owing to this arrangement of the slits of the valve when the slits $g\,g$ coincide with the slits $ff$ of the cylinder, the slits $g'\,g'$ will stand, respectively, on opposite sides of the slits $f'f'$, and removed therefrom a distance equal to the width of a slit. The slits $f'f'$ will therefore be closed when the slits $ff$ are open, and vice versa, and a partial rotation of the valve for a distance equal to the width of a slit will cause one pair of cylinder slits to be closed and the other pair opened. Such movements of the valve are effected by electro-magnetism, through the following-described devices:

To the valve G is secured a curved electro-magnet, I, the polar portions of the core of which are supported in and project through a bracket, $i$, formed of diamagnetic material, preferably brass, and projecting in an edgewise direction from the valve, while the connected ends of the cores are supported in a cup-like or socket bracket, $i'$, projecting from the valve in a similar manner.

To the removable flange $h'$, which is fixed to the cylinder, is secured a stationary electro-magnet, K, curved in the opposite direction to the magnet I, and having the polar portions of its cores supported and projecting through a bracket, $k$, projecting laterally from the flange $h'$, while their connected ends are held in a cup-like bracket, $k'$, also projecting laterally from the said flange. The poles of the magnet I, which is secured to the valve, stand directly opposite the poles of the magnet K, which is secured to the fixed flange $h'$.

To the flange $h'$, near the poles of the magnet K, is secured one end of an elongated loop spring, L, the other end of which enters a notch in an inwardly-projecting portion of the bracket $i$, which supports the polar portions of the magnet I, and through one arm of this loop-spring is arranged an adjusting-screw, $m$, the tip of which bears against the other arm. By means of this screw the free arm of the spring, or that which bears against the bracket on the valve, is adjusted to normally hold the valve in any desired position, with the poles of the two magnets separated by such space that they will exert a vigorous attraction upon each other when their cores are magnetized. The coils of the two magnets I and K are connected, as shown, by the wire $z$, and so wound that when traversed by an electric current the poles of the magnets will be in attractive relation—that is, the north pole of each magnet will face the south pole of the other. The conducting-wire $w$, over which the current flows to the magnet-coils, passes through the main and branch pipes and the coupling-hose, suitable means being provided in the hose-couplings whereby the wire terminals of one car may be electrically connected with the wires of adjacent cars. In the present instance, a small bent pipe, $p$, leads from the elbow-coupling $e$ of the branch air-pipe to an opening in the cylinder, to afford a protected passage for the leading-wires to the coil-terminals of the magnets. After the wires have been led through the pipe $p$, it is filled with paraffine or some similar substance to prevent the passage of air through the said pipe.

The leading-wires of each car must of course terminate at the hose-couplings at each end of the car, and I have combined with the hose-couplings devices by which the wires may be electrically connected from car to car simultaneously with the coupling of the hose. The hose-coupling and wire-connecting devices are illustrated in Fig. 1, but will not be claimed here, as I have filed a separate application for a patent for such combination of devices.

The hose $x$ will be connected with the pipes in the usual manner.

Figure 1:
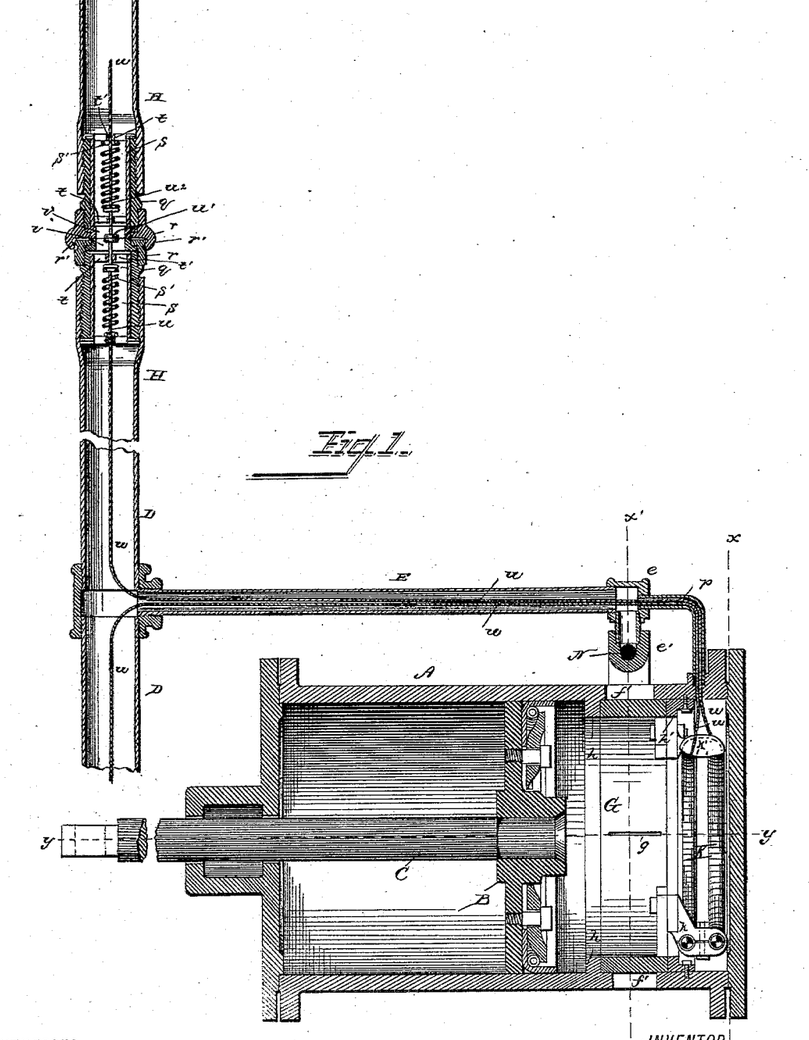
Figure 1 is a diametric section of an air-brake cylinder and connections provided with an electro-magnetic valve according to my invention, this view illustrating also a hose-coupling provided with devices for connecting the conducting-wires from car to car.
Figure 2:
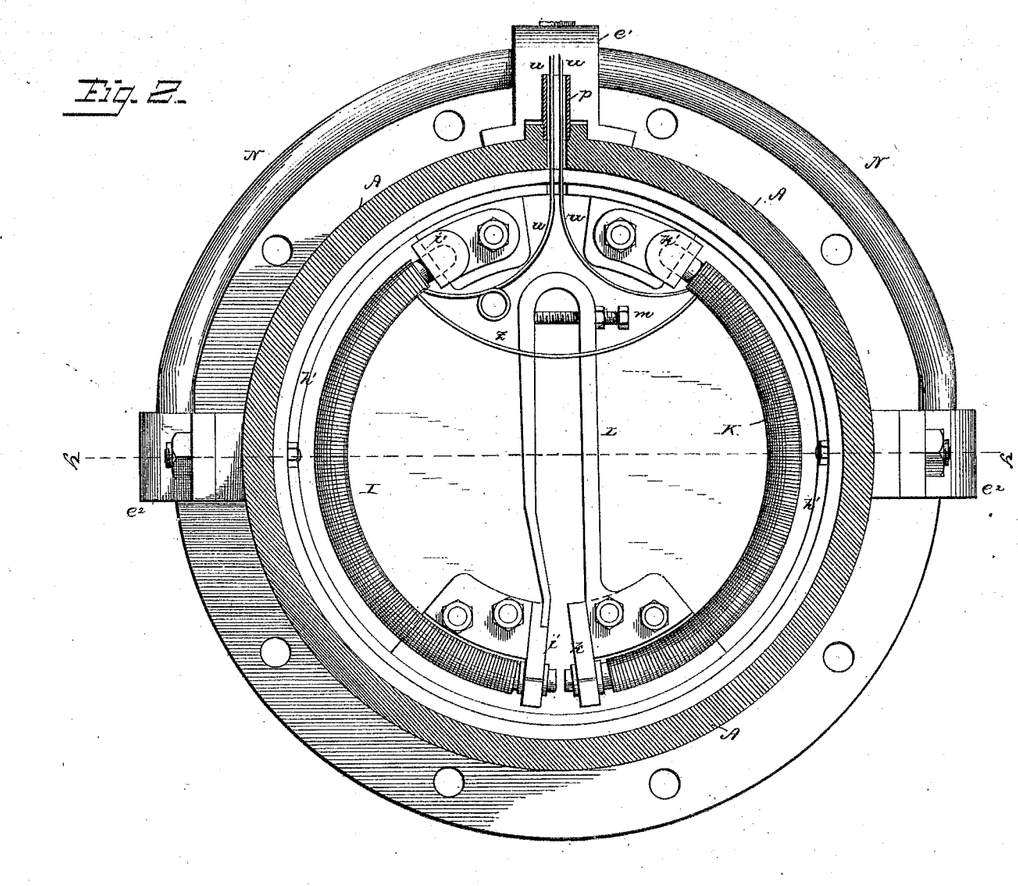
Fig. 2 is a cross-section of the cylinder and wire-conduit on the line $x\,x$ of Fig. 1, looking toward the piston, the interior parts being shown in elevation.

In the coupling shown in Fig. 1, $q\ q$ are metallic thimbles secured in the hose ends, and $r\ r$ are the coupling-clutches, which are screwed onto said thimbles and provided, respectively, with interlocking lugs or wings $r'$ $r'$ of ordinary construction. Within the thimbles $q\ q$ are secured casings $s\ s$, made of hard rubber or other insulating material, and having at their ends cross-bars $t\ t$, which support central bearings, $t'$, for sliding metallic rods $u$, each of which has one end projecting outwardly and the other inwardly from the insulating-casing. The outer end of each rod is provided with a flat head, $u'$, and on each rod, behind its outer bearing, is formed a shoulder, $u^2$, against which bears one end of a spiral spring, $s'$, the other end of which bears against the inner bearing of the rod. The springs are arranged to drive the rods normally outward, but they are prevented from escaping and have their outward play limited by the shoulders $u^2$.

To the inner ends of the rods $u$ are soldered or otherwise electrically connected the leading or conducting wires $w$. It will now be seen that when the opposite parts of the hose-couplings are clutched together the heads $u'\ u'$ of the rods $u\ u$ will be brought in contact with each other and the rods forced inward a short distance against the tension of the springs, which are thus caused to force the two heads together with a continuous pressure, which insures a good electrical contact. Within the coupling-clutches are snugly fitted gaskets $v\ v$, of india-rubber or similar material, the edges of which come together when the coupling is closed and form an air-tight joint. By providing the hose-couplings with the wire-connecting devices, as shown, the electrical connections are made and broken between the cars automatically and simultaneously with the coupling and uncoupling of the hose.

Upon each end of each railway-car I secure a stationary metallic coupling, as shown at Q, near the hose, so that the hose-coupling may be connected thereto, as shown. The central nipple, $Q'$, of the clutch of the stationary coupling is arranged to come in contact with the head of the spring-rod of the hose-coupling, and the nipple $Q'$ of each stationary coupling is placed in electrical connection with a metallic car-axle at the same end of the car, as indicated by dotted lines. This electrical connection will be made in practice by means of an insulated wire connecting the nipple with the journal box or bearing of the axle in a well-understood manner, requiring no special illustration. One of the poles of the generator, which is to be located, preferably, upon the locomotive, will be connected with the line of leading-wires which pass through the pipes, and the other pole will be connected with one of the locomotive-axles; and it will be seen that when a train of cars has its hose coupled and wires connected, the last car having its rear hose coupled to its stationary coupling, a return-route for the electrical current is established through said stationary coupling, its wire-connection, the car axle and wheel, the rails of the track, and the locomotive wheel and axle. At the same time the rear end of the air-connections is closed by the stationary coupling, so that no air can escape or vacuum be interfered with.

Figure 9:
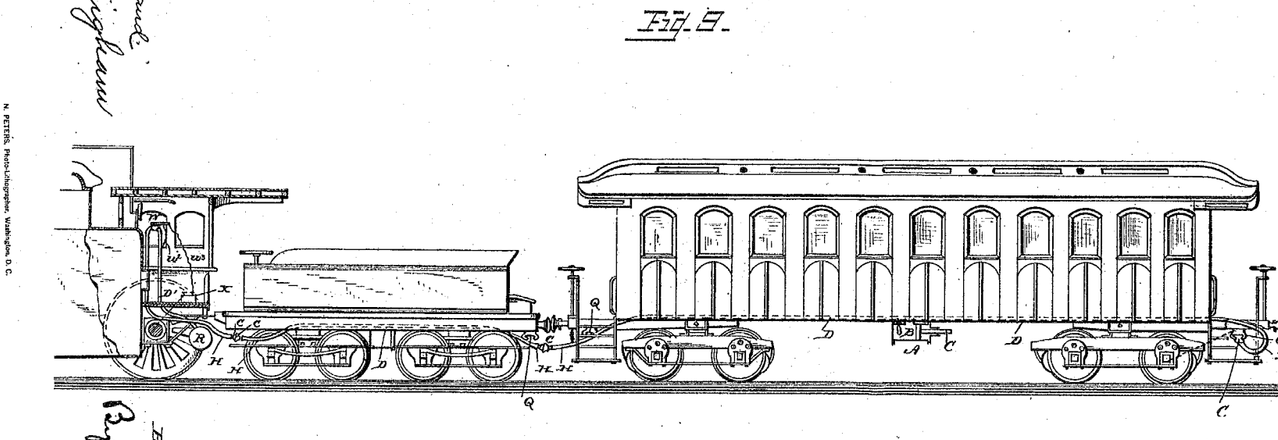
Fig. 9 is a diagram illustrating the manner of constructing the electric circuit.
Figures 10, 11:
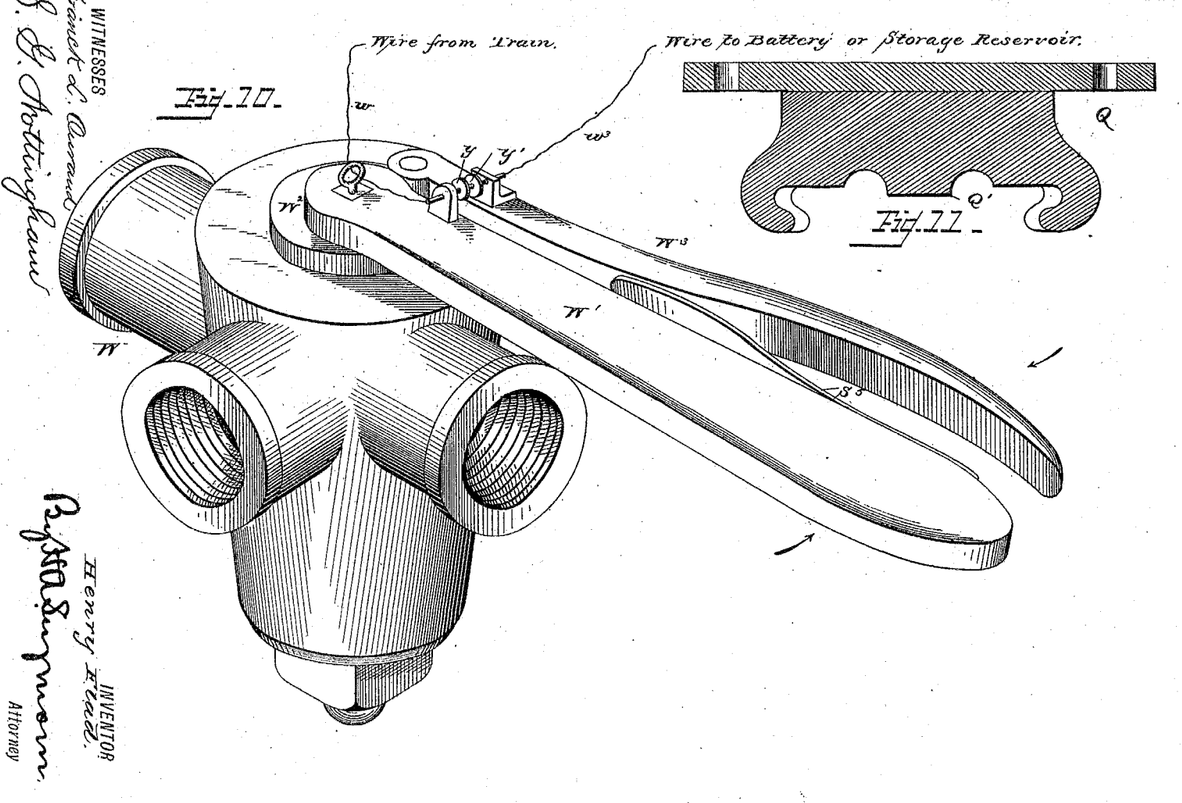
Fig. 10 is a perspective view of a three-way cock provided with circuit-closing devices.
Fig. 11 is an axial section of the stationary coupling.

By referring to Figs. 9 and 10 it will be seen that one of the wires, $w^2$, which is used to connect the electric battery X with the leading-wires, enters the pipe $D'$, which connects the reservoir $R'$ with the locomotive-hose at a point beyond the three-way cock W from the reservoir, and is connected with a metal spring-button, $y$, mounted on the main lever $W'$, which is rigidly attached to the plug $W^2$ of said three-way cock. To the plug is pivoted a supplementary lever, $W^3$, upon which is mounted a metallic spring-button, $y'$, which is connected with a wire, $w^3$, leading to the battery, and may be brought into contact with the button $y$ by swinging the supplementary lever toward the main lever, the two levers being held normally apart by a spring, $s^5$. The three-way cock is constructed and arranged in the manner usual in air-brake apparatuses.

Having now explained the details of construction and general arrangement involved in my invention, I will explain the mode of using the same in connection with the several styles of air-brakes which I have heretofore mentioned; and from this explanation and the before-given description the application of the invention to other styles of air-brakes will be readily understood by persons familiar with the art of applying such brakes to cars.

I will first explain the mode of using my invention with air-cylinders used to operate brakes of the Mallinckrodt type. In this system compressed air is used to drive the pistons to operate bell-crank levers which are connected with the car-body and the brakes.

The main pipes, hose, and cylinders are kept charged with compressed air, and the car-body elevated, except when the brakes are to be applied, and at such times the air is allowed to escape from the cylinders, so that the pistons may move inward and allow the car-body to descend and apply the brakes by its weight. This result might be accomplished by permitting the air to escape at the three-way cock; but its accomplishment in this manner would be attended with the delays and shocks, and the necessity of entirely refilling the pipes, hose, and cylinders every time the brakes are fully applied, as heretofore stated.

In using my invention, when it is desired to fully apply the brakes, the engineer will move the supplementary lever $W^3$ at the three-way cock to bring the buttons $y$ and $y'$ in contact, grasping both levers, however, and moving the main lever to cut off connection between the reservoir and pipes. The battery-circuit being completed by the contact of the two buttons, the current will flow over the leading-wires and charge the magnets I and K, so that they will have an attraction for each other. As only the magnet I is movable, it will be drawn toward the magnet K, and as it moves it will cause the valve to which it is secured to turn sufficiently, in the direction indicated by the arrows, to open the slits $f'\ f'$ of the cylders, which communicate with the external air, and close the slits $f\ f$, which communicate with the air-pipes. The compressed air will therefore escape from the cylinders and relieve the pistons, but is not permitted to escape from the pipes. The pistons being relieved thus simultaneously on all the cars, the car-bodies will descend and apply the brakes on every car of the train at the same time. When, now, it is desired to take off the brakes, the supplementary lever is released, the circuit broken, and the magnets being discharged, the valves will be moved to their normal position by their retracting-springs, so that communication between the cylinders and external air will be cut off, and communication between the cylinders and air-pipes established. The main lever is turned to re-establish communication between the pipes and reservoir, and the pipes being full of compressed air, it immediately rushes into all the cylinders, and the pistons of all are operated simultaneously to raise the cars and take off the brakes, and only as much additional air needs to be supplied as will compensate for the quantity flowing from the pipes to charge the cylinders, while in the old mode of operating the brakes the entire system of air-conduits must be entirely relieved of compressed air in applying the brakes and fully charged anew in taking them off.

If it is desired to only somewhat slacken the speed of the train without coming to a full stop, the engineer will make only such a brief contact between the buttons $y$ and $y'$ as will allow a sufficient quantity of air to escape to accomplish the desired effect. In those systems in which the compressed air is used to drive the pistons to set the brakes, as in the Westinghouse brake, the main pipe will be kept full of compressed air all the time, and the valves will be so set as to normally open communication between the cylinders on one side of the pistons and the external air, and to close the slits leading to the air-pipe. Then the engineer, in applying the brakes, will simply operate the supplementary lever to close the circuit, leaving open the communication between the reservoir and the air-pipe. When the valve turns in response to the attraction of the magnets, the slits opening to the outside air will be closed, and those leading to the air-pipes will be opened, and the compressed air will rush into all of the cylinders and apply the brakes simultaneously on all the cars of a train. When the current is broken, the valves resume their normal positions, the cylinders are emptied, and the flow of air thereto from the main pipe is cut off. The brakes will therefore be fully relaxed from the wheels. Of course, a slackening of speed, instead of a full stop, may be effected by a brief closing of the current; but when it is desired to stop the train, the circuit will be kept closed until the stoppage is accomplished. In vacuum-brakes the main pipe will be kept exhausted of air, and the valves will be so set that there is no communication between the cylinders and this pipe, but free communication between the cylinders and external air. Then, when the circuit is closed, the valve will in turning close the slits leading to the air outside and open those which establish communication with the pipe. The partial vacuum which is thus produced on one side of the pistons and the atmospheric pressure on the other result in the operation of said pistons to apply the brakes. When the current is again broken, the valves are caused to resume their normal position by the retracting-springs, outside air flows into the cylinders through the slits, the vacuum in the cylinders is destroyed, and the brakes, therefore, allowed to release the wheels.

When diaphragms are used to operate vacuum-brakes, the valves and devices for working them may be arranged in short cylinders or chambers connected on one side with the main or branch air-pipes, and on the other with the diaphragm-chambers at one side of the diaphragms.

The advantages attending the application of my improvement to air-brakes may be briefly recapitulated as follows: First, all the brakes on a train of cars, however long, may be put on or taken off simultaneously, and there will therefore be no shocks from cars running upon others in front or from jerking the car-couplings by forward cars before the brakes are released on cars behind; second, delays in checking speed and getting under way are obviated, as the supply or exhaust pipes may be kept either always charged or exhausted, as the case may be, and thus furnish a prompt supply or exhaust for the cylinders or diaphragm-chambers; third, the main pipes may be made of large diameter, to serve as reservoirs of compressed air or as vacuum-chambers, and the hose and hose-couplings may be of small diameter and easily handled, since on each the main pipe may serve as a reservoir, the pressure or vacuum in which is only disturbed when the brakes are operated, and they may be restored to standard pressure or vacuum at leisure in the intervals between the operations of the brakes; fourth, neither the electric conducting-wires nor the valves are exposed to injury, the former being protected by the pipes, and the latter by the cylinders in which they are inclosed; fifth, if the electric apparatus should get out of order, the brakes may be operated through the three-way cock or any ordinary controlling-valves located on the engine.

For the leading-conductors I will use, in practice, insulated copper wires, though I do not confine myself to any particular kind of conductors; and for the source of electricity I prefer the type of battery known as "accumulating" or "secondary" batteries, as they may be charged and furnished to trains ready for use, and require no care from the engineer or other person on the locomotive. They, moreover, furnish a strong current promptly and uniformly when the circuit is closed.

Having fully described my invention, what I claim as new, and desire to secure by Letters Patent, is—

1. The combination, with the main air-pipe of an air-brake system and a series of brake-cylinders arranged on different cars, and having pistons connected with the brakes thereof, respectively, of a series of valves arranged to connect said cylinders through suitable connections alternately with the main pipe and with the external air, and a series of electro-magnets arranged to operate said valves, substantially as described, whereby the brakes of a train may be operated automatically and simultaneously.

2. The combination, with the cylinder having openings or ports, substantially as described, of the annular valve having suitable air-passages, and arranged to open and close said cylinder-ports, an electro-magnet arranged to operate said valve, and means for including said electro-magnet in an electric circuit extending outside of the cylinder, essentially as set forth.

3. The combination, with the cylinder having an annular valve-seat formed therein, and suitable ports or openings leading outward from said seat, and the annular valve fitted to said seat and provided with proper air-passages, of an electro-magnet secured to said valve, and a stationary electro-magnet arranged to co-operate with the said valve-magnet, the helices of said magnet being connected and arranged to be included in a circuit extending outside of the cylinder, substantially as described.

4. The combination, with an air-brake cylinder provided with ports, substantially as described, its piston, and the supply or exhaust pipe and coupling-hose of a railway-car, of an electro-magnetic valve arranged to open said ports, conducting-wires connected with the electro-magnetic devices of said valve, and arranged within the supply or exhaust pipe and coupling-hose, and automatic wire-connecting devices arranged in the hose-couplings, whereby the electric wires may be connected from car to car simultaneously with the coupling of the hose, substantially as described.

5. The combination, with the air-pipes, coupling-hose, conducting-wires arranged within said pipes and hose, and the automatic wire-connecting devices arranged in the hose-couplings, of the stationary couplings, one or more, arranged upon a car, and connected with a wheel or wheels thereof through intermediate electrical conductors, essentially as and for the purpose set forth.

6. In an air-brake system, the combination, with the air-pipes and inclosed conducting-wires, an electric battery, and circuit including said conducting-wires, of the three-way cock arranged in the air-conduit, and provided with circuit closing and breaking devices, and means for operating the same simultaneously with the operation of the said three-way cock, substantially as described.

In testimony whereof I have signed this specification in the presence of two subscribing witnesses.

HENRY FLAD.

Witnesses:
 A. B. METCALF,
 FRITZ HÖPPNER.